United States Patent [19]

Motani et al.

[11] Patent Number: 4,990,542

[45] Date of Patent: Feb. 5, 1991

[54] EXTRUDED SYNTHETIC RESIN FOAM AND ITS MANUFACTURING METHOD

[75] Inventors: Shigeru Motani, Hirakata; Tadayuki Saito, Osaka; Toshiya Ito, Hokkaido, all of Japan

[73] Assignee: Kanegafuchi Kagaku Kogyo Kabushiki Kaisha, Osaka, Japan

[21] Appl. No.: 388,147

[22] Filed: Aug. 1, 1989

[30] Foreign Application Priority Data

Aug. 2, 1988 [JP] Japan .................. 63-193717
Jun. 30, 1989 [JP] Japan .................. 1-170928

[51] Int. Cl.$^5$ ............................ C08J 9/10
[52] U.S. Cl. ........................ 521/79; 521/88; 521/91; 521/92; 521/146; 521/148; 521/908; 521/143
[58] Field of Search ............ 521/79, 88, 91, 92, 521/146, 148, 143, 908

[56] References Cited

U.S. PATENT DOCUMENTS

| | | | |
|---|---|---|---|
| 3,962,154 | 6/1976 | Elgi | 521/79 |
| 4,438,224 | 3/1984 | Suh et al. | 521/79 |
| 4,446,253 | 5/1984 | Hahn et al. | 521/79 |
| 4,455,272 | 6/1984 | Schubert et al. | 264/53 |
| 4,473,665 | 9/1984 | Martini-Vvedensky et al. | 521/79 |
| 4,522,955 | 6/1985 | Fukushima et al. | 521/79 |
| 4,559,367 | 12/1985 | Hurps et al. | 521/79 |

Primary Examiner—Morton Foelak
Attorney, Agent, or Firm—Renner, Otto, Boisselle & Sklar

[57] ABSTRACT

An extruded synthetic resin foam comprises a cell structure of substantially two different cell sizes, the smaller size being not more than about 0.25 mm while the other size is from about 0.4 to about 1 mm. The cells are dispersed in an island in the sea manner. A foam such as a styrenic foam is produced by forming a mixture of synthetic resin, a fine mineral powder having hydroxyl groups, and a cell controlling agent, incorporating a volatile foaming agent and extruding the mixture to form a foam. The powder has a particle size of not more than 100 nm and may be a silica having silanol groups.

8 Claims, 3 Drawing Sheets

1mm

EXTRUDED SYNTHETIC RESIN FOAM AND ITS MANUFACTURING METHOD

FIELD OF THE INVENTION

The present invention relates to an extruded synthetic resin foam and its manufacturing method.

BACKGROUND OF THE INVENTION

Various manufacturing methods for extruded synthetic resin foam have been well known so far. In general, methods have been adopted wherein a cell controlling agent is added to a synthetic resin material such as styrenic resin, melted and mixed together, and then the mixture is added to by a volatile-type foaming agent and extruded into a low pressure space to produce an extruded synthetic resin foam by the evaporation of the volatile-type foaming agent.

Among extruded synthetic resin foams manufactured according to the above-mentioned method, styrenic ones are favorable especially because they have a high expansion ratio and a uniform cell structure, and, in addition, exhibit excellent heat insulating properties and suitable mechanical strengths, and widely used usually as an insulating material and the like.

However, the extruded styrenic synthetic resin foam obtained with the above-mentioned method is basically polystyrene, which is high in rigidity. It is desirable to improve the flexibility of such a foam.

Thus, it is known to make an extruded synthetic (especially polystyrene) resin foam with fine and uniform cell structure to improve the foam's heat insulating properties and flexibility. However, making the cell size smaller involves a problem of increasing the density of the foam due to an effect of the surface tension of the cell membrane. Thus, it is difficult to obtain a synthetic resin foam having a low, not larger than 28 kg/m$^3$ density with a uniform cell structure. It is desirable to make the foam body thicker by making the cell size smaller for the purpose of providing heat insulating properties and flexibility. Such intention, however, involves a problem that a resulting increase in the anisotropy of cell in the direction of the cell wall causes the heat insulating properties and the bending strength to reduce.

Actually in that connection, also the present inventors tried to make a styrenic resin foam having a fine and uniform cell structure by adjusting the amount of the foaming agent and the amount of the foam controlling agent. However, they failed in attaining the aimed heat insulating properties and flexural strength due to an increased anisotropy of resulting cells when the cell size was reduced to not more than 0.4 mm. Further, a reduction of the cell size to 0.2 to 0.3 mm made the foam body thinner rapidly, resulting in a difficulty of obtaining a synthetic resin foam having a satisfactory, thick body.

Furthermore, as a manufacturing method for an extruded synthetic resin foam, a method for manufacturing such a foam has been disclosed by U.S. Pat. No. 4,455,272. In this method, the melted resin in the extruding machine is pressure incorporated into by water to provide the resin with an expanding potential by water evaporation, and thus is cooled by the latent heat of evaporation.

Further, a method for obtaining a foam having a cell structure in which smaller and larger cells are formed together has been disclosed by U.S. Pat. No. 4,559,367.

In this method, a water-containing organic vegetable substance having a 75 to 500 micron particle size is added in order to disperse the water uniformly.

In view of the above, the inventors eagerly sought to obtain a synthetic resin foam which possesses not only excellent heat insulating properties and suitable flexural strength which are essentially requested by any synthetic resin foam but also an excellent flexural strength. As a result, they found a system by which it is possible to manufacture an extruded synthetic resin foam which may satisfy all the above requirements and is constituted mainly by specific smaller cells and cells specifically larger in comparison with the former to complete the present invention.

SUMMARY OF THE INVENTION

The present invention concerns the following subjects:

(1) An extruded synthetic resin foam wherein foam-constituting cells are mainly composed of cells with not greater than 0.25 mm cell size and cells with 0.4 to 1 mm cell size, and the cells with not greater than 0.25 mm cell size occupy 10 to 80 percent of a sectional area of the foam. (2) A manufacturing method for the extruded synthetic resin foam above-mentioned, wherein (A) 100 parts by weight of synthetic resin, (B) 0.5 to 10 parts by weight of a granular matter with not greater than 1000 nm particle size, which has hydroxyl groups on its surface layer and has 10 to 70% by weight of a rate of adsorption of water and/or a $C_1$ to $C_4$ alcohol, and (C) 0.05 to 5 parts by weight of a cell controlling agent are melted and mixed together, and then the mixture is pressure incorporated into by a volatile-type foaming agent to be extrusion foamed. And (3) a manufacturing method for an extruded synthetic resin foam wherein both 0.1 to 2 parts by weight of fine mineral powder with not greater than 1000 nm particle size which has hydroxyl groups on its surface layer, and 0.01 to 5 parts by weight of a cell controlling agent are added to 100 parts by weight of synthetic resin, mixed together and melted by heating, and the mixture is pressure, incorporated into by a volatile-type foaming agent and 0.2 to 1.5 parts by weight of water, and then extruded into a low pressure space so that both cells with not greater than 0.25 mm cell size and cells with 0.4 to 1 mm cell size may be mainly generated.

BRIEF DESCRIPTION OF THE DRAWINGS

Each of FIGS. 1 and 2 is the sketch drawing of an electron microscopic photograph enlarged (magnification 30) for the purpose to describe the internal structure of the extruded synthetic resin foam obtained by the manufacturing method of the invention.

DESCRIPTION OF THE PREFERRED EMBODIMENTS

Figure 1:
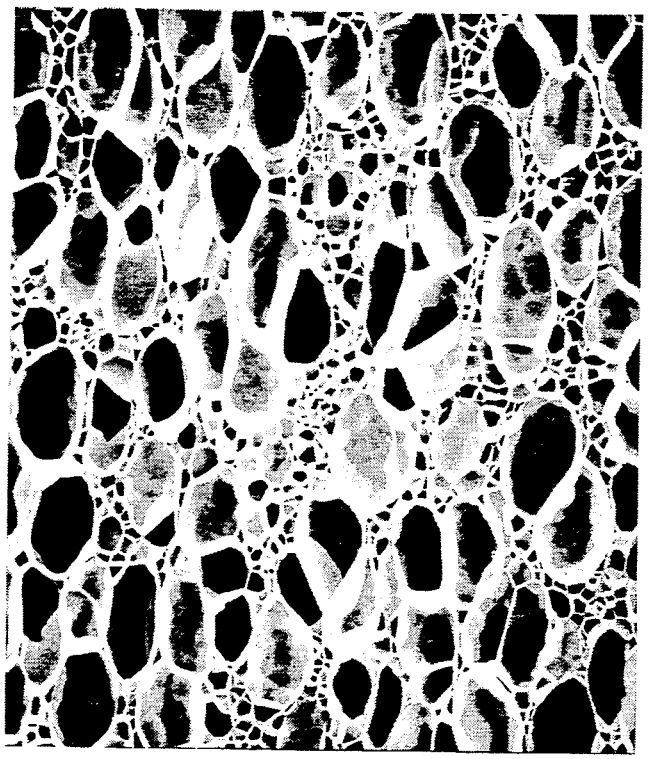

The extruded synthetic resin foam of the present invention is obtained through either Process (I) wherein (A) 100 parts by weight of a thermoplastic resin, (B) 0.5 to 10 parts by weight of a granular matter with not greater than 1000 nm particle size, which has hydroxyl group on its surface layer and has 10 to 70% by weight of a rate of adsorption of water and/or a $C_1$ to $C_4$ alcohol, and (C) 0.05 to 5 parts by weight of a cell controlling agent are melted and mixed together by heating, and then into the mixture is pressure incorporated a volatile-type foaming agent, and finally is extruded into a lower pressure (usually atmospheric) space, or Process (II) wherein (A) 100 parts by weight of a synthetic resin, (B) 0.1 to 2 parts by weight of fine mineral powder with not greater than 1000 nm particle size, which has hydroxyl groups on its surface layer, and (C) 0.01 to 5 parts by weight of a cell controlling agent are mixed together and melted by heating, and into the mixture is pressure incorporated (D) a volatile-type foaming agent, and (E) 0.2 to 1.5 weight of water, and finally is extruded into a low pressure space so that mainly both cells with not greater than 0.25 mm cell size and cells with 0.4 to 1mm cell size may be dispersed with the intervention of cell membranes in an island-in-sea way. The resulting extruded synthetic resin foam of the invention exhibits excellent heat insulating properties, a suitable bending strength and an excellent flexibility.

First, a description of Process (I) is given as follows:

As synthetic resin in the invention, thermoplastic resins such as styrenic, ethylenic, propylenic and urethane resins are useful. Among them, styrenic, ethylenic and propylenic resins are desirable especially because they can be suitably processed with an extrusion foaming technique. Further especially suitable one is the styrenic resin, which is excellent in heat insulating properties and rigidity but is expected to be improved in its flexibility or the like. As such a styrenic resin, polystyrene, copolymers of styrene with $\alpha$-methylstyrene, maleic anhydride, acrylic acid, acrylic esters, methacrylic acid, methacrylic esters and the like, and polystyrenes modified by blending styrene butadiene rubber (SBR) and the like are useful, for example.

The granular matter used in the invention is supposed to function as a cell controlling agent which can generate cells with not greater than 0.25 mm cell size. As such a granular matter, the one (hereinafter called a water-containing granular matter) with not greater than 1000 nm particle size, which carries hydroxyl groups on its surface layer and has 10 to 70% by weight of a rate of surface adsorption of water and/or a $C_1$ to $C_4$ alcohol, is useful.

One of the main features of the invention is to use such a water-containing granular matter. When such a water-containing granular matter is added in a properly adjusted amount, cells with not greater than 0.25 mm cell size are generated efficiently. The reason for this efficiency of generation of cells with not greater than 0.25 mm cell size is not still clear, but supposed to be caused by the process in which, when the water-containing matter is mixed with the synthetic resin by heating, the water is released from the former and dispersed in a microscopic state to create nucleating spots for forming cells with not greater than 0.25 mm cell size.

As such a granular matter of not greater than 1000 nm particle size, which carries hydroxyl groups on its surface layer, anhydrous silica carrying silanol groups on its surface is typically useful, which is available from Japan Aerosil Co. (AEROSIL ®) for example. The primary particles which is made by a wet process have the particle size above-specified. However, secondary particles with 1 to 10 micron particle size, which are formed by agglomeration of the primary particles, also can be used in a similar manner. An example of products with secondary agglomeration in a wet process is Nipseal ® of Nippon Silica Co. When the granular matter has a greater than 1000 nm particle size, a tendency appears that the water released from the water-containing granular matter becomes difficult to disperse microscopically. Therefore, the one with not greater than 1000 nm particle size is preferable. The particle size of the granular matter should be further preferably not less than 5 nm taking account of easy availability, and most preferably 10 to 100 nm. The reason for using a granular matter having hydroxyl groups on its surface layer in the invention is that the granular matter adsorbs water and/or a $C_1$ to $C_4$ alcohol through hydrogen bonds and does not release them until mixed with the synthetic resin under heat.

As the $C_1$ to $C_4$ alcohol above-mentioned, methanol, ethanol, propanol, n-butanol and i-butanol are useful, for example. Each of these alcohols is usually used either singly or combinedly.

The rate of adsorption of water and/or a $C_1$ to $C_4$ alcohol by the granular matter is given by the following formula:

$$[\text{rate of adsorption (\%)}] = ([\text{weight of water adsorbed (g)}]/[\text{weight of water-containing granular matter (g)}]) \times 100$$

In the invention, a water-containing granular matter having a rate of adsorption of 10 to 70% by weight, preferably of 20 to 60% by weight, and further preferably of 30 to 60% by weight. Such a rate of adsorption varies depending on both the number of hydroxyl groups on the surface layer and the amount of the granular matter blended with the synthetic resin. In general, however, less than 5% by weight of the water-containing granular matter causes an insufficient amount of water released from the granular matter, and consequently, the granules cannot from nucleating spots for cells with not greater than 0.25 mm cell size. On the other hand, a more than 70% by weight of the water-containing granular matter generally promotes larger agglomerates of the granular matter, and consequently, the uniform dispersion of the granular matter into the synthetic resin becomes difficult.

The blending amount of the water-containing granular matter is desirable to be 0.5 to 10 parts, preferably 1.0 to 5.0 parts per 100 parts of the synthetic resin by weight. This blending amount of the water-containing granular matter is desirable to be adjusted appropriately according to the aimed cell size, so cannot be defined in a wholesale manner. In general, however, a less than 0.5 parts by weight of the blending amount tends to cause the concentration of the water-containing matter in the synthetic resin to decrease, making it difficult to secure a uniform dispersing state. On the other hand, a more than 10% by weight of the water-containing granular matter generally causes the matter to separate from the synthetic resin on mixing them together, making a uniform dispersion difficult and raising the manufacturing cost.

As a cell controlling agent in the invention, ones used in well-known extrusion foaming processes are applicable. Concretely, talc powder and calcium carbonate powder are useful. Each of these cell controlling agents is used either singly or combinedly. The particle size of such a cell controlling agent is desirable to be usually 3 to 100 micron, especially 5 to 20 μm. Such a cell controlling agent is adopted in order to control the sizes of the cells of 0.4 to 1.0 mm cell size which would be mainly formed in an extruded synthetic resin foam. The blending amount of such a cell controlling agent is adjusted to be 0.05 to 5 parts, preferably 0.1 to 2.5 parts per 100 parts of the synthetic resin by weight. A less than 0.05 parts by weight blending amount generally enlarges the cell size making it difficult to secure the aimed density (not greater than 28 kg/m$^3$) of the foam.

The extruded synthetic resin foam of the invention is obtained by that definite amounts of the synthetic resin, water-containing granular matter, and cell controlling agent are mixed together and melted by heating, and into the mixture is pressure incorporated the volatile-type foaming agent and then extrusion foamed.

The heating temperature, melting and mixing time, and means for melting and mixing the synthetic resin, water-containing granular matter, and cell controlling agent are all not specifically limited. The heating temperature is allowable as far as it is not lower than the temperature at which the synthetic resin melts, and, that is, usually 150° to 250° C. The melting and mixing time cannot be defined in a wholesale manner because it varies depending on the amount of the extruded output, the means of melting and mixing, and the like, but is usually designated by the time period which is necessitated by uniformly dispersing the synthetic resin, water-containing granular matter, and cell controlling agent. The means of melting and mixing is not specifically limited provided that it is a means used in usual extrusion foaming processes, for example, a screw-type extruder.

As a volatile-type foaming agent in the invention, the ones used generally in extrusion foaming processes are useful, including methyl chloride, chloro-fluoro-carbons (CFC) such as freon 12 and freon 11, other halogenated hydrocarbons represented by hydrogen-containing freons (for example, 1-chloro-1,1-difluoroethane), which are said to hardly destruct the ozone layer, and saturated hydrocarbons represented by propane and butane. Each of these volatile-type foaming agents may be used either singly or combinedly.

The using amount of such a volatile-type foaming agent is desirable to be 0.1 to 0.3 moles, preferably 0.15 to 0.25 moles per 100 g of the synthetic resin. Less than 0.1 mole using amounts of the volatile-type foaming agent tend to cause an increased shrinkage of the synthetic resin foam after extruding; more than 0.3 moles using amounts tend to cause a decreased dimensional stability of the synthetic resin foam.

A synthetic resin foam which is mainly composed of both cells with not greater than 0.25 mm cell size and cells with 0.4 to 1 mm cell size is manufactured by a usual process to extrude the volatile-type foaming agent incorporated synthetic resin through a foaming device such as a slit die.

Next, a description of Process (II) is given as follows:

In order to obtain a synthetic resin foam which possesses a cell structure which characterizes the invention, it is preferred to use (A) a synthetic resin, (B) fine mineral powder of not greater than 1000 nm particle size, carrying hydroxyl groups on its surface layer, (C) a cell controlling agent, (D) a volatile-type foaming agent, and (E) water. Especially, both (B) the fine mineral powder of not greater than 1000 nm particle size, having hydroxyl groups on its surface layer, and (E) the water are essential to exist. Both components act critically.

As (A) a synthetic resin, ones cited above for Process (I) is useful.

(B) fine mineral powder of not greater than 1000 nm particle size, having hydroxyl groups is supposed to function as a cell controlling agent to generate cells with not greater than 0.25 mm cell size.

The reason for the fact that such powder efficiently generates cells of not greater than 0.25 mm is not still clear. However, it is estimated that the powder is mixed and melted by heating with the synthetic resin, and the pressure incorporated water is surrounded by hydroxyl group existing on the surface layer of the fine mineral powder uniformly dispersed in the synthetic resin, through hydrogen bonds to disperse uniformly in a microscopic manner and thus creates fine nucleating spots for forming cells with not greater than 0.25 mm cell size.

As mentioned above, in the invention fine mineral powder with not greater than 1000 nm particle size, having hydroxyl group on its surface layer, exists in the melted resin with appropriate amounts of water and the cell controlling agent. This makes it possible to steadily obtain a foam having a cell structure in which both cells with not greater than 0.25 mm cell size and cells with 0.4 to 1 mm cell size mainly exist with intervention of cell membranes in an island-in-sea state.

The fine mineral powder with a greater than 1000 nm particle size tends to make nucleating spots for forming fine cells larger. Therefore, the particle size of the fine mineral powder is desirable to be not greater than 1000 nm. It is further desirable to be not less than 5 nm taking account of easy availability and handling, and especially desirable to be 10 to 100 nm.

As such fine mineral powder with not greater than 1000 nm particle size, having hydroxyl groups on its surface layer, it is possible to typically cite anhydrous silica which has silanol groups on its surface. An example of such anhydrous silica is AEROSIL ®, which is made by Japan Aerosil Co. through a dry process.

Furthermore in the invention, secondarily agglomerated particles of, for example, wet-process silica also can be used as the fine mineral powder in the same way as the above provided that they have a 1 to 10 mm particle size and that the original primary particles have a not greater than 1000 nm particle size. A typical example of such wet-process silica products is Nipseal ® of Nippon Silica Co.

The using amount of the above fine mineral powder is 0.1 to 2 parts, preferably 0.3 to 1 parts per 100 parts of the synthetic resin by weight. Less than 0.1 part by weight of the using amounts of the fine mineral powder tend to cause the number of formed fine cells to lessen even though the amount of the pressure incorporated water is varied, resulting in a decreased effect in the aimed improvement of the product properties. On the other hand, greater than 2 parts by weight of the using amounts of the fine mineral powder tend to make agglomerates of the fine mineral powder in the synthetic resin larger.

The above fine mineral powder is not always required to be an absolutely dried product, but even a water absorbing product is also usable. When a water absorbing product is used, the amount of water pressure incorporated will be controlled on taking account of the amount of water already absorbed.

As (C) a cell controlling agent, the ones cited for Process (I) are useful. The using amount of such a cell controlling agent is allowably the same as in that for Process (I).

The synthetic resin, fine mineral powder, and cell controlling agent are weighed by a respective, prescribed amount, melted and mixed together by heating, and the melted mixture is pressure incorporated into by the volatile-type foaming agent and a prescribed amount of water.

The heating temperature, melting and mixing time, and means for melting and mixing the synthetic resin, fine mineral powder, and cell controlling agent are all not specifically limited. The heating temperature is allowable as far as it is not lower than the temperature at which the synthetic resin melts, and, that is, usually 150° to 250° C. The melting and mixing time cannot be defined in a wholesale manner because it varies depending on the extruded amount per unit time, the means of melting and mixing, and the like, but is usually designated by the time period which is necessitated by uniformly dispersing the synthetic resin, fine mineral powder, and cell controlling agent. The means of melting and mixing is not specifically limited provided that it is a means used in usual extrusion foaming processes, for example, a screw-type extruder.

The water used in the invention is not specifically limited. Pure water is applicable, for example. The amount of water which is pressure incorporated into the melted mixture is desirable to be 0.2 to 1.5 parts, preferably 0.3 to 0.7 parts per 100 parts of the synthetic resin by weight. Both less than 0.2 parts by weight and greater than 1.5 parts by weight of amount of water tend to make difficult to obtain a foam which has a cell structure in which both cells with not greater than 0.25 mm cell size and cells with 0.40 to 1 mm cell size disperse with intervention of cell membranes in an island-in-sea manner, and which, consequently, can contribute to improvement in properties such as heat conductivity and bending deflection of the synthetic resin foam. In other words, a foam having a good cell structure aimed at by the invention is secured by defining the using amount of water to a range from 0.2 parts to 1.5 parts per 100 parts of the synthetic resin by weight.

The volatile-type foaming agent and water may be pressure incorporated either simultaneously or separately into the melted mixture. The invention is not restricted by such means for pressure incorporation.

The pressure at which the volatile-type foaming agent and water are incorporated into the melted mixture is not specifically limited, but is allowable as far as it is higher than the internal pressure of the extruder.

Then, the melted mixture which was pressure incorporated into by the volatile-type foaming agent and the prescribed amount of water is extruded into a lower pressure (usually atmospheric) space through a usually used foaming device such as a slit die. A synthetic resin foam which is composed mainly of both cells with not greater than 0.25 mm cell size and cells with 0.4 to 1 mm cell size is securely obtained by thus extruding the melted resin into a low pressure space.

Any synthetic resin foam of the invention shall have two peaks of its distribution of cell size in both the region of not greater than 0.25 mm cell size and the region of 0.4 to 1 mm. In the foam, however, the content of cells locating between these two peaks in cell size is desirable as small as possible. For example, the content of both cells with from greater than 0.25 mm to smaller than 0.4 mm cell size and cell with greater than 1 mm cell size is preferably not greater than 30%, further preferably not greater than 20%, and most preferably not greater than 10%.

As described above, a synthetic resin foam of the invention has a cell structure which either cells with not greater than 0.25 mm cell size or cells with 0.4 to 1 mm cell size does not form any layer, but mainly the cells with 0.4 to 1 mm cell size form islands and mainly the cells with not greater than 0.25 mm cell size form sea to construct an "island-in-sea" structure, or to have a structure in which the cells with not greater than 0.25 mm cell size directly surround the cells with 0.4 to 1 mm cell size with intervention of cell membranes.

The reason for the fact that a synthetic resin foam of the invention has a low heat conductivity is supposed to be due to that, while, in a conventional synthetic resin foam having a uniform cell structure, a heat flow transfers through the uniform cell structure, in the synthetic resin foam of the invention, such a heat flow is blocked off by fine cells with not greater than 0.25 mm cell size which exist around cells with 0.4 to 1 mm cell size. Further as for the bending strength and deflection, it is supposed that the suitable bending properties are exhibited because, the stress which affects the cell membranes is dispersed by fine cells with not greater than 0.25 mm cell size which exist dispersively in an island-in-water state as above-mentioned.

Thus, in the synthetic resin foam of the invention, mainly both cells with not greater than 0.25 mm cell size and cells with 0.4 to 1 mm cell size are dispersed in an island-in-sea state, for example. It is supposed that while the fine cells with not greater than 0.25 mm cell size lead to the reduction of the heat conductivity and the increase of the bending deflection, the cells with 0.4 to 1 mm cell size maintain the bending strength. It is desirable that both the cells with not greater than 0.25 mm cell size and the cells with 0.4 to 1 mm cell size are dispersed uniformly in the synthetic resin foam of the invention from the viewpoint of reducing the heat conductivity, increasing the bonding deflection and providing the suitable bending strength.

As above-mentioned, it is desirable that the cell size of the fine cells in the synthetic resin foam of the invention is not greater than 0.25 mm. Fine cells of greater than 0.25 mm cell size tend to increase the heat conductivity and to reduce the bending deflection. The cells with 0.4 to 1 mm cell size is further preferable to have a 0.4 to 0.7 mm cell size.

Although it seems that cells with about 0.25 mm cell size exist in a considerable proportion according to the distribution diagram which presents the ratios of occupied area (hereinafter defined) of the foam obtained by Example 1, cells with not greater than 0.25 mm cell size prove to be major according to the distribution frequency. Thus in the invention, values by which greater and smaller size cells are differentiated each other has a rather relative significance, the nature of the invention is that an unprecedented excellent foam in which both greater and smaller size cells coexist and exhibit the respective characteristics is presented actually.

As for the constitution ratio between the cells with not greater than 0.25 mm cell size and cells with 0.4 to 1 mm cell size, the cells with not greater than 0.25 mm cell size occupy preferably 10 to 80%, further preferably 20 to 70%, and most preferably 20 to 50% of sectional area of the foam. Less than 10% ratios of area occupied by cells with not greater than 0.25 mm cell size tend to reduce the flexibility, and greater than 80% ratios tend to reduce the mechanical strengths such as bending and compressive strengths.

The thickness of the synthetic resin foam of the invention is not specifically limited, but is desirable to be like in other usual plate products, greater than that of thin sheet products, and to be 10 to 100 mm, and further preferably 10 to 400 mm for the purpose of providing desirable heat insulating properties, bending strength, and bending deflection.

The density of the synthetic resin foam of the invention is not specifically limited, but is desirable to be 15 to 50 kg/m$^3$ to provide a light weight and excellent heat insulating properties and bending strength.

Because the synthetic resin foam of the invention has excellent heat insulating properties, and suitable bending strength and bending deflection, it is suitably applied typically as a heat material for wood houses which is required to exhibit a great bending deflection during installing.

Here it should be made sure that an extruded synthetic resin foam of the invention is not specifically limited in its manufacturing method provided that it possesses such a cell structure as mentioned above.

Further detailed description on the extruded synthetic resin foam and its manufacturing method of the invention are given as follows, based on Examples. The invention is never limited to these examples.

EXAMPLE 1

One and a half (1.5) parts by weight of fine particles of silicon dioxide (Aerosil #200, Japan Aerosil Co., absorbed water content 50% by weight, average size of primary particle 12 nm) as a water-containing granular material, and 0.1 part by weight of talc as a cell controlling agent are added to 100 parts by weight of polystyrene resin (Estyrene G-17, Shin-Nittetsu Chemical Co., melt index (MI) 3.1), and mixed together at 200° C. During mixing, 9 parts by weight of a volatile-type foaming agent which is composed of 70% by weight of methyl chloride and 30% by weight of propane is pressure incorporated into the mixture, and then the mixture is cooled to about 110° C., and foamed by extruding through a 20 mm-clearance slit to obtain a 40 to 60 mm thick plate of extruded synthetic resin foam.

The sketch drawing of an enlarged photograph of a longitudinal cross section of the obtained extruded synthetic resin form is shown in FIG. 1.

FIG. 1 is the sketch drawing of an enlarged electron microscopic photograph of a longitudinal cross section of the obtained extruded synthetic resin foam by a scanning election microscope (Model S-450 of Hitachi, Ltd.) at a magnification of 30. In this sketch drawing, cells are deflected long in the direction of thickness, but this is the only example; the direction and degree of deflection of cells can be varied with extruding conditions.

As shown in FIG. 1, an extruded synthetic resin foam of the invention proves to have an island-in-sea structure in which cells with not greater than 0.25 mm (especially not greater than 0.1 mm) cell size exist around cells with 0.4 to 1 mm cell size with intervention of cell membranes.

Then, properties of the obtained foam, including density, specific ratio of occupied area, heat conductivity, bending strength, bending deflection at break, and appearance were determined according to the following procedure, respectively. Results are shown in Table I.

Density of foam:
It is given by the following formula:

[Density of foam] = [weight of foam]/[volume of foam]

Ratio of occupied area (1) A photograph of a longitudinal section of the extruded synthetic resin foam is taken with a scanning electron microscope (Model S-450 of Hitachi, Ltd.) at a magnification of 30, and a copy is made of the photograph using a dry copying machine.

(2) Cells having greater than 7.5 mm diameter in the direction of thickness in the copy (in the vertical direction in the photograph) are painted over with black ink (the primary treatment)

(3) The primary treated image is measured with an image-treating apparatus (Model PIAS of Pias Co.).

(4) The primarily treated image is taken in with simulated colors, and divided into two regions according to the degree of shade/light.

(5) The shade parts with not greater than 750 image (corresponding to not greater than 0.25 mm cell size) are changed to light.

(6) Using FPACTAREA (area ratio) in the function of the image-analysis computer, the area occupied by cells with not greater than 7.5 mm cell size (the shade division) in the whole image is calculated according to the following formula:

[Ratio of occupied area (of smaller cells)] =

$$\left(1 - \frac{\text{number of images in shade region}}{\text{number of images in the whole picture}}\right) \times 100$$

Heat conductivity
It is determined in accordance with JIS A-1511.
Bending strength and bending deflection
They are determined in accordance with JIS A-9511.
Appearance
It is visually checked whether the obtained foam involves abnormalities such as harmful deformation.

Figure 3:
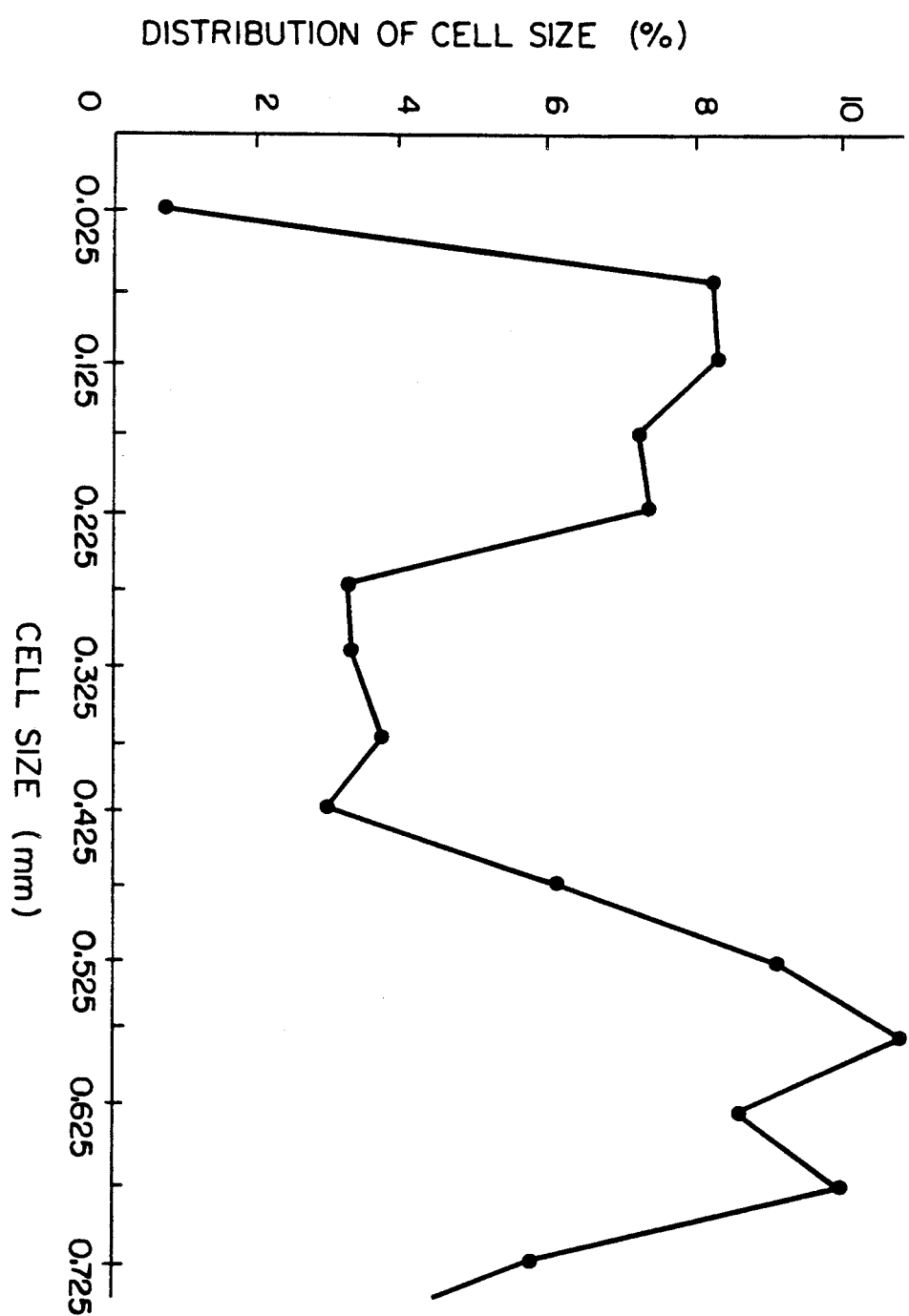
FIG. 3 is the histogram which indicates the cell size distribution of the extruded synthetic resin foam obtained in Example 1 of the invention.

Then the distributing condition of cell size in the foam obtained in Example 1 is examined according to the following procedure. The distributing condition of cell size is shown in FIG. 3; the frequency of appearance each fraction of cell size is shown in Table 2.

EXAMINING PROCEDURE FOR DISTRIBUTING CONDITION OF CELL SIZE (1) A photograph of a longitudinal cross section of the extruded synthetic resin foam is taken with a scanning electron microscope (Model S-450 of Hitachi, Ltd.) at a magnification of 30, and a copy is taken therefrom with a dry copying machine.

(2) A piece of tracing paper is placed on the photographic copy. Then, all the cell membranes are colored with black ink, and another copy is taken thereof with the dry copying machine (the primary treatment).

(3) The above primarily treated image is analyzed with an image treatment apparatus (Model PIAS-II of Pias Co.). The result is shown in Table 2.

(4) Based on the result shown in Table 2, the area per cell each fraction of cell size is found from the cell size, and the total area occupied by each fraction is calculated by multiplying the above area by the frequency to obtain FIG. 3.

FIG. 3 clearly demonstrates that mainly both smaller and greater cells coexist in a foam of the invention.

EXAMPLES 2 TO 7 AND COMPARATIVE EXAMPLES 1 TO 4

Extruded synthetic resin foams are obtained in the same way as in Example 1 except that materials shown in Table 1 are as a water-containing granular matter and a cell controlling agent.

The properties of the obtained extruded synthetic resin foam are determined in the same ways as in Example 1. The results are shown in Table 1.

Figure 4:
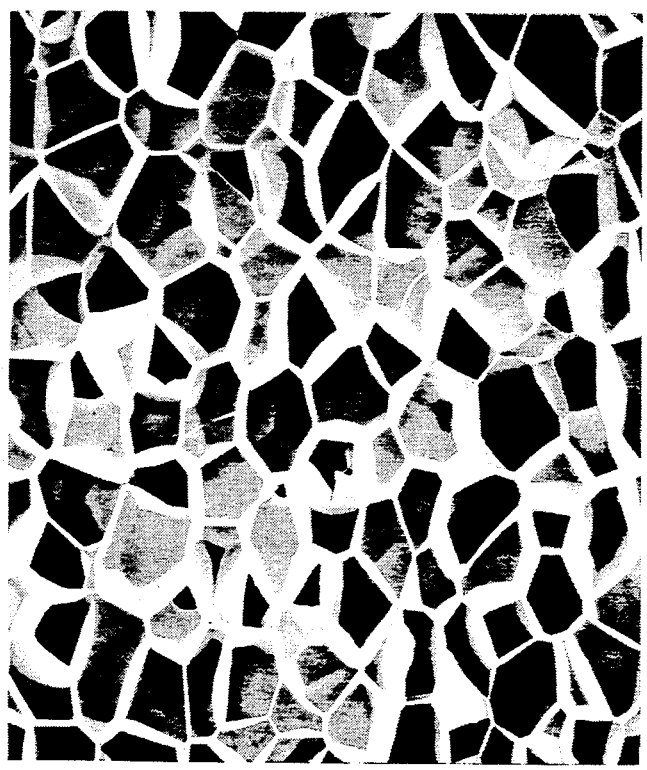
FIG. 4 is the sketch drawing of an electron microscopic photograph enlarged (magnification 30) for the purpose to describe the internal structure of the extruded synthetic resin foam obtained in Comparative Example 2.

The sketch drawing of the enlarged photograph of a longitudinal cross section of the extruded synthetic resin foam obtained in Comparative Example 2 is shown in FIG. 4. FIG. 4 is the sketch drawing of the enlarged electron microscopic photograph which is taken from a longitudinal cross section of the extruded synthetic resin foam obtained in Comparative Example 2, with use of a scanning electron microscope (Model S-450 of Hitachi, Ltd.) at a magnification of 30).

size and cells with 0.4 to 1 mm cell size, the conventional extruded sythetic resin foam is composed of cells with the approximately same cell size.

Further, results shown in Table 1 indicate the extruded synthetic resin of the invention is excellent in heat insulating properties because of its lower heat conductivity as much as not less than 5% compared with that of any one of Comparative Examples, and has a greater bending strength. Furthermore, it is proved that the extruded synthetic resin foam of the invention is excellent in flexibility by the fact that, while the bending deflection of break of the extruded synthetic resin foam in Comparative Examples is 20 to 35 mm, that of the extruded symthetic resin foam of the invention exceeds 65 mm, the upper limit measurable according to the JIS method.

EXAMPLE 8

Both 0.75 parts by weight of fine powder of silicon dioxide (Aerosil #200 of Japan Aerosil Co., average size of primary particle 12 nm) as a fine mineral material and 0.1 part by weight of talc as a cell controlling agent are added to 100 parts by weight of polystyrene resin

TABLE 1

| | Water-contg. granular matter (part) | Cell controlling agent (part) | Properties of synthetic resin foam | | | | | |
|---|---|---|---|---|---|---|---|---|
| | | | Density (kg/m$^3$) | Area occupied by cells (%) | Heat conductivity (Koal/m · hr · C.°) | Bending strength (kg/cm$^2$) | Bending defrection at break (mm) | Appearance |
| No. of Ex. | | | | | | | | |
| 1 | Water-contg. silicon dioxide*$^1$ (1.0) | Talc (0.1) | 28.0 | 47 | 0.0313 | 2.7 | >65*$^2$ | Good |
| 2 | Water-contg. silicon dioxide*$^1$ (1.5) | Talc (0.1) | 28.0 | 66 | 0.0310 | 2.6 | >65 | Good |
| 3 | Water-contg. silicon dioxide*$^1$ (1.5) | Talc (0.1) | 27.0 | 45 | 0.0307 | 2.4 | >65 | Good |
| 4 | Water-contg. silicon dioxide*$^3$ (7) | Talc (0.1) | 26.5 | 20 | 0.0310 | 2.3 | 45 | Good |
| No. of Comparative | | | | | | | | |
| 1 | — | Talc (0.1) | 28.0 | — | 0.0338 | 2.0 | 20 | Good |
| 2 | — | Talc (0.2) | 29.6 | — | 0.0340 | 1.8 | 35 | Good |
| 3 | Dry silicon dioxide*7 | Talc (0.2) | 27.0 | — | 0.0338 | 1.9 | 25 | Good |
| 4 | — | Talc (1.5) | 35.0 | — | 0.0330 | 2.2 | 45 | Not good |

(Notes)
*$^1$Rate of adsoption 50%, average particle size 12 nm.
*$^2$Impossible to follow up >65 because of bending of foam at break.
*$^3$Rate of adsoption 30%, average particle size 20 nm.

| Cell size (mm) | Frequency (time) | Share (%) |
|---|---|---|
| >0 to ≦0.05 | 202 | 29.23 |
| 0.05 | | |
| 0.05 to 0.10 | 270 | 39.07 |
| 0.10 to 0.15 | 98 | 14.18 |
| 0.15 to 0.20 | 44 | 6.37 |
| 0.20 to 0.25 | 27 | 3.91 |
| 0.25 to 0.30 | 8 | 1.16 |
| 0.30 to 0.35 | 6 | 0.87 |
| 0.35 to 0.40 | 5 | 0.72 |
| 0.40 to 0.45 | 3 | 0.43 |
| 0.45 to 0.50 | 5 | 0.72 |
| 0.50 to 0.55 | 6 | 0.87 |
| 0.55 to 0.60 | 6 | 0.87 |
| 0.60 to 0.65 | 4 | 0.58 |
| 0.65 to 0.70 | 4 | 0.14 |
| 0.70 to 0.75 | 2 | 0.58 |
| 0.75 to 0.80 | 4 | 0.29 |
| 0.80 to | 0 | 0 |

The sketch drawings, which are shown in FIGS. 1 and 4, of electron microscopic photographs of extruded synthetic resin foams demonstrate that, while an extruded synthetic resin foam of the invention is composed of both cells with not greater than 0.25 mm cell (Estyrene G-17 of Shin Nittetsu Chemical Co., melt index (MI) 3.1), and mixed together at 200° C. During mixing, 9 parts by weight of a volatile type foaming agent which is composed of 70% by weight of methyl chrolide and 30% by weight of propane and 0.5 parts by weight of water are pressure incorporated into the mixture, and then the mixture is cooled to about 110° C., and foamed by extruding through a 2.0 mm clearance slit into an atmospheric space to obtain a 40 to 60 mm-thick plate of extruded synthetic resin foam.

Figure 2:
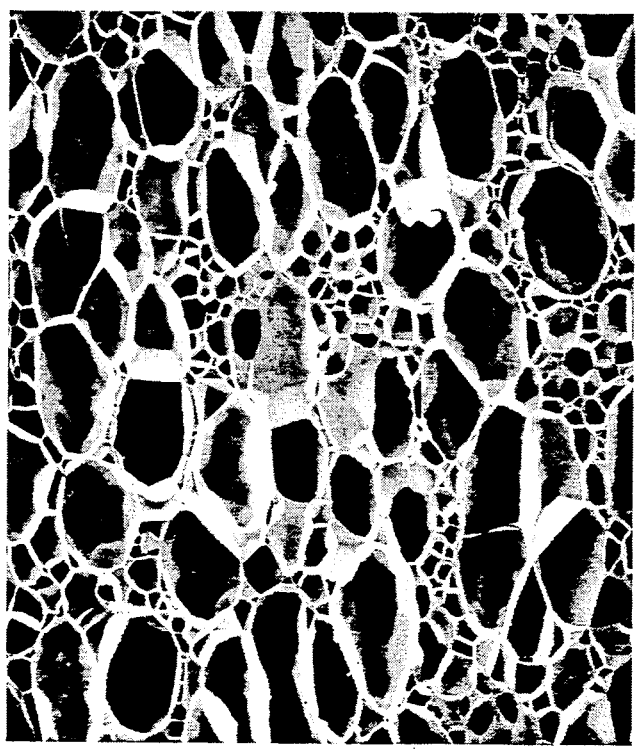

The sketch drawing of an enlarged photograph of a longitudinal cross section of the obtained extruded synthetic resin foam is shown in FIG. 2.

FIG. 2 is the sketch drawing of an enlarged electron microscopic photograph of a longitudinal cross section of the obtained extruded synthetic resin foam, taken by a scanning electron microscope, (Model S-450 of Hitachi, Ltd.) at a magnification of 30. In this sketch drawing, cells are deflected long in the direction of thickness, but this is the only example; the direction and degree of deflection of cells can be varied with extruding conditions.

As shown in FIG. 2, an extruded synthetic resin foam of the invention proves to have an island-in-sea structure in which cells with not greater than 0.25 mm (especially not greater than 0.1 mm) cell size exist around cells with 0.4 to 1 mm cell size with intervention of cell membranes.

Then, properties of the obtained synthetic resin foam, including density, heat conductivity, bending strength, bending deflection at break, appearance, and specific ratio of area occupied by the cells with not greater than 0.25 mm cell size, were determined in the same ways as in Example 1. Results are shown in Table 3.

EXAMPLES 9 to 12 AND COMPARATIVE EXAMPLES 5 to 8

Extruded synthetic resin foams are obtained in the same way as in Example 8 except that the type and amount of the fine mineral powder, the amount of the cell controlling agent, and the amount of water pressure incorporated are selected as shown in Table 3.

The properties of the obtained extruded synthetic resin foam are determined in the same ways as in Example 8. The results are shown in Table 3.

TABLE 3

| | Raw material for synthetic resin foam (part by weight) | | | Properties of synthetic resin foam | | | | | |
|---|---|---|---|---|---|---|---|---|---|
| | Fine mineral powder | Wet process silica*1 | Cell controlling agent | Density (kg/m³) | Heat conductivity (Kcal/m · hr · C.°) | Bending strength (kg/cm²) | Bending defrection at break (m/m) | Appearance | Area occupied by smaller cells (%) |
| No. of Ex. | | | | | | | | | |
| 8 | Aerosil #200 (0.75) | Water (0.5) | Talc (0.1) | 28.5 | 0.0290 | 2.6 | >65 | Good | 45 |
| 9 | Aerosil #200 (0.4) | Water (0.4) | Talc (0.1) | 29.0 | 0.0285 | 2.6 | " | Good | 55 |
| 10 | Aerosil #200 (0.75) | Water (0.5) | Talc (0.5) | 30.0 | 0.0285 | 2.8 | " | Good | 40 |
| 11 | Aerosil #200 (0.75) | Water (1.0) | Talc (0.1) | 27.5 | 0.0295 | 2.5 | " | Good | 30 |
| 12 | Wet silica*1 | Water (0.5) | Talc (0.1) | 28.0 | 0.0295 | 2.5 | " | Good | 40 |
| No. of Comparative Example | | | | | | | | | |
| 5 | — | Water (0.5) | Talc (0.1) | 28.5 | 0.0335 | 2.3 | 20 | Not good | ≦5 |
| 6 | Aerosil #200 (0.75) | — | Talc (0.1) | 28.5 | 0.325 | 2.3 | 20 | Good | 0 |
| 7 | Aerosil #200 (0.75) | Water (0.15) | Talc (0.1) | 28.0 | 0.320 | 2.3 | 20 | Good | 0 |
| 8 | Aerosil #200 (0.75) | Water (2.0) | Talc (0.1) | 26.5 | 0.0335 | 2.3 | 15 | Good | 0 |

The sketch drawings (FIGS. 2 and 4) of electron microscopic photographs of extruded synthetic resin foams demonstrate that, while the extruded synthetic resin foam of the invention is composed of both fine cells with not greater than 0.25 mm cell size and cells with 0.4 to 1 mm cell size, the conventional extruded synthetic resin foam is composed of cells with the approximately same cell size.

Further, results shown in Table 3 indicate the extruded synthetic resin of the invention is excellent in heat insulating properties because of its lower heat conductivity as much as not less than 5% compared with that of any one of Comparative Examples 5 to 8, and has a greater bending strength. Furthermore, it is proved that the extruded synthetic resin foam of the invention is excellent in flexibility by the fact that, while the bending deflection at break of the extruded synthetic resin foam in Comparative Examples 5 to 8 is 15 to 35 mm, that of the extruded synthetic resin foam of the invention exceeds 65 mm, the upper limit measurable according to the JIS method.

The extruded synthetic resin foam obtained with the manufacturing method of the invention is superior in heat insulating properties to the conventional synthetic resin foam, and maintains a suitable bending strength and suitable bending deflection. Therefore, it is suitably applicable not only as a common heat insulating material but also as a heat insulating material for wooden houses which requires a great bending deflection during application.

What is claimed is:

1. A method for preparing an extruded synthetic resin foam composed cells having substantially two sizes, one of the sizes being not more than about 0.25 mm and the other size being from about 0.4 to about 1 mm, wherein the cells with sizes not more than about 0.25 mm occupy from about 10 to about 80 percent of a sectional area of the foam, comprising the steps of:

A. forming a mixture of (a) a synthetic resin, (b) a granular material having hydroxyl groups on the surface, having a particle size of not more than about 1,000 nm, and having about 10% to about 70% by weight of the weight of absorption of water, a $C_1$ to $C_4$ alcohol or mixtures thereof, and (c) a cell controlling agent;

B. incorporating a foaming agent selected from halogenated hydrocarbons, saturated hydrocarbons, and mixtures thereof into the mixture under pressure; and C. extruding the mixture to form a foam.

2. The method of claim 1, wherein the granular matter is present in an amount from about 0.5 to about 10 parts by weight of the resin, and wherein the cell controlling agent is present in an amount from about 0.05 to about 5 parts by weight of the resin.

3. The method of claim 1, wherein the resin is a styrenic resin.

4. A method for preparing an extruded synthetic resin foam composed cells having substantially two sizes, one of the sizes being not more than about 0.25 mm and the other size being from about 0.4 to about 1 mm, wherein the cells with sizes not more than about 0.25 mm occupy from about 10 to about 80 percent of a sectional area of the foam, comprising the steps of:

A. forming a mixture of (a) a synthetic resin, (b) a fine mineral powder having hydroxyl groups on the surface, having a particle size of not more than about 1,000 nm, and (c) a cell controlling agent;
B. incorporating a foaming agent selected from halogenated hydrocarbons, saturated hydrocarbons, and mixtures thereof and water under pressure into the mixture; and
C. extruding the mixture to form a foam.

5. The method of claim 4, wherein the amount of (b) is from about 0.1 to about 2 parts by weight of the resin, the amount of (c) is about 0.01 to about 5 parts by weight of the resin, the amount of water is about 0.2 to 1.5 parts by weight of the resin.

6. The method of claim 4, wherein the resin is a styrenic resin.

7. The method of claim 4, wherein the powder is silica having silanol groups.

8. The method of claim 4, wherein the mixture is extruded into a region of low pressure.

* * * * *